United States Patent

Keller

[15] 3,651,249

[45] Mar. 21, 1972

[54] METHOD OF REPRODUCING POLYCHROMATIC PICTURE ORIGINALS

[72] Inventor: Hans Keller, Kiel-Wik, Germany

[73] Assignee: Dr.-Ing. Rudolf Hell

[22] Filed: Feb. 16, 1970

[21] Appl. No.: 11,702

[30] Foreign Application Priority Data

Feb. 25, 1969 Germany ......................P 19 09 292.3

[52] U.S. Cl. ..........................................178/5.4 R, 178/5.2 A

[51] Int. Cl. ..........................................................H04n 9/02

[58] Field of Search.................................178/5.2, 5.2 A, 5.4

[56] References Cited

UNITED STATES PATENTS 3,450,830 6/1969 Kyte...................................178/5.2 A 2,183,524 12/1939 Yule.................................178/5.2 A

*Primary Examiner*—Richard Murray

*Attorney*—Hill, Sherman, Meroni, Gross and Simpson

[57] ABSTRACT

A method of reproducing polychromatic picture originals employs the continuous comparison of color separation voltages derived by means of an interposed color separation filter system and extraction of the smallest voltage at any one time of the color signal voltages for producing a white separation. The white separation is superimposed on the color separation as a mask, preferably a highlight mask, wherein only those portions of the white separation voltage which exceed a predetermined threshold value are utilized for the highlight mask. The white separation may also advantageously be employed in the reproduction of negative picture originals as a negative black separation.

6 Claims, 4 Drawing Figures

INVENTOR.
Hans Keller

BY Hill, Sherman, Meroni, Gross & Simpson
ATTORNEYS

INVENTOR
Hans Keller

BY Hill, Sherman, Meroni, Gross & Simpson
ATTORNEYS

METHOD OF REPRODUCING POLYCHROMATIC PICTURE ORIGINALS

BACKGROUND OF THE INVENTION

1. Field of the Invention

The present invention relates to a method for reproducing polychromatic picture originals in which color signal voltages are obtained by photoelectrically scanning the picture original with the interposition of color separation filters, the voltages being utilized for controlling a recording member for making color records, hereinafter called "separations," and a signal voltage being extracted from said voltages for producing a further separation by continuously comparing the color signal voltages with each other.

2. Description of the Prior Art

According to heretofore known and established procedures, a black separation is made as a further separation and a corresponding color reference signal is obtained for the color separations. This method is adopted so as to achieve as saturated a black as it is possible to obtain by printing, one over the other, chromatic colors having the same color content, and simultaneously reducing the amount of color of the chromatic colors to such an extent that the total amount of color does not exceed a degree allowable for wet-on-wet printing.

There are, however, cases in the art of reproduction which another problem is of greater importance. If a direct original is to be reproduced, for example one which is painted with varied light or even luminescent opaque colors on an off-white i.e., grey or yellowish paper (water color paper, etching paper, artist's cardboard), then color values can occur in the color separations which are lighter than the background representing the hue of the paper. This undesired effect could only be eliminated hitherto by tedious and time-consuming hand-retouching.

SUMMARY OF THE INVENTION

So as to be able to dispense with the above-mentioned hand work, the present invention proposes to utilize a white separation as the further color separation. In carrying the present invention into effect, the smallest voltage at any one time is taken from the continuous comparison of the color signal voltages, and is utilized for producing the white separation.

The white separation is advantageously superimposed on the color separations as a mask, preferably a highlight mask. In this way, nothing is changed as regards the usual number of printing forms i.e., three color separation forms and a black printer.

By the highlight mask is to be understood a mask which is only effective on those parts of the picture which exceed a predetermined minimum luminosity. Therefore, so as to suppress the effect of the white separation signals on the darker parts of the picture, it is proposed to use only that part of the white separation voltage that exceeds a predetermined threshold value.

The white separation can advantageously be utilized on the other hand also in the reproduction of negative picture originals as a negative i.e., black separation. This is essentially simpler to carry out than, as is also possible, to invert the color signal voltages, i.e., to create a difference between the actual voltage value and a fixed voltage.

BRIEF DESCRIPTION OF THE DRAWINGS

In order that the invention may be more clearly understood, reference will now be made to the accompanying drawings, showing certain features and embodiments of the invention, and in which:

FIG. *1a* is a diagrammatic illustration of color separation signals;

Figure 1A:
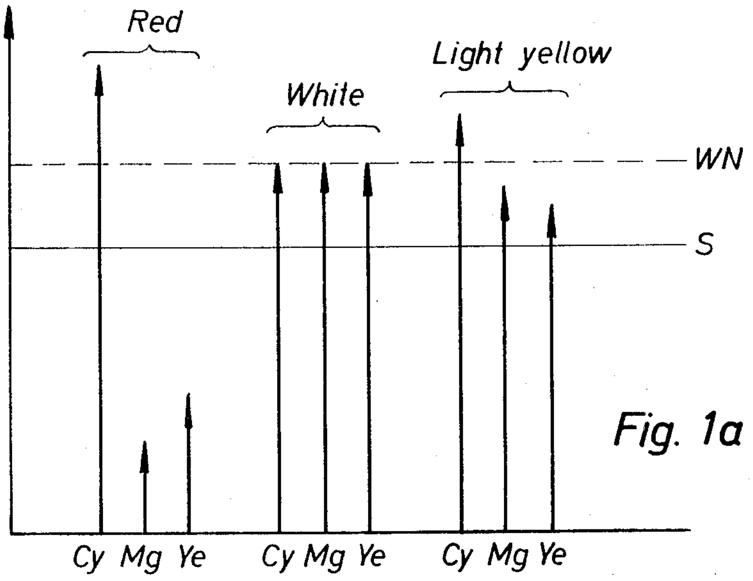
Figure 1B:
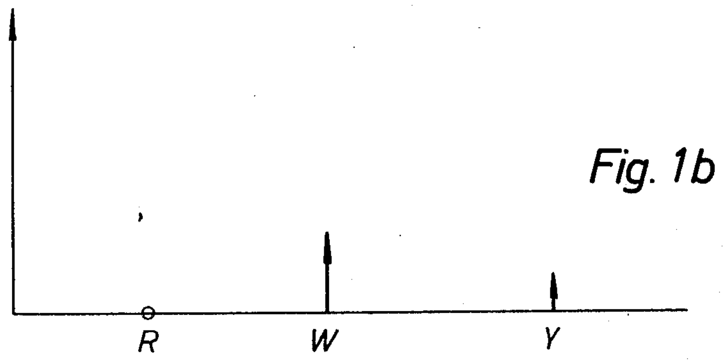
Figure 2:
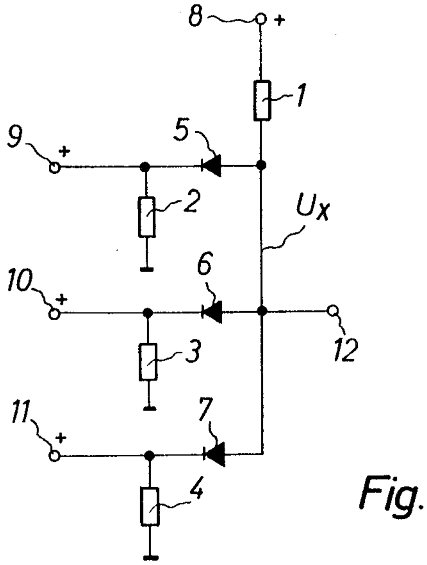
Figure 3:
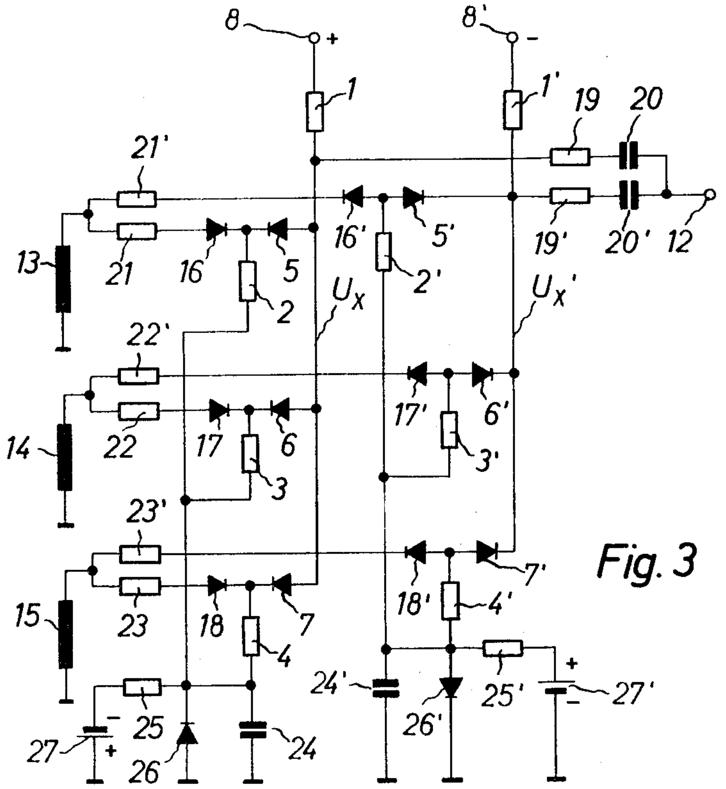

FIG. *1b* is a diagrammatic illustration of the highlight mask signals in accordance with the principles of the present invention;

FIG. 2 is a circuit diagram which may be utilized for ascertaining the smallest of three color signal voltages; and FIG. 3 is another circuit diagram for ascertaining the smallest of three color signal voltages.

DESCRIPTION OF THE PREFERRED EMBODIMENTS

Referring now to the drawings, the color signal voltages for cyan Cy, magenta Mg and yellow Ye separations are shown in FIG. *1a* and for each of the three cases of particular interest viz a red, white and light yellow part of the original.

The broken horizontal line having the reference WN designates the white level of the original carrier.

When as required, the paper of the original is not pure white but grey, then the case shown in the drawing can occur, i.e., a red and a light yellow original part results in a larger color signal in the cyan Cy separation than the background WN of the original. So that this effect is not reproduced, the original white must also be correspondingly accentuated when producing the color separations.

From a red original part, the smallest color signal occurs in the magenta Mg separation and from a light yellow original part the yellow separation Ye. The original white results in the same degree of color signals in all three color separations. The circuits according to FIGS. 2 and 3 may be employed for selecting the smallest signal supply, in this case, a signal equal to the signals.

The continuous horizontal line having the reference S shows the aforementioned threshold value by which means it is determined whether and of what part the actually ascertained smallest color signal is utilized for producing the highlight masks or whether it is suppressed.

FIG. *1b* shows the highlight mask signals resulting therefrom. Since in the present case with the original red R, the smallest color signal, namely that of the magenta Mg separation, lies far below the threshold value, it is not utilized for the production of the highlight mask.

The largest resultant mask signal is, as intended, that with the original white W, while the mask signal with the original yellow Y is so small that it only lightens the yellow slightly. The circuit arrangement according to FIG. 2 is suitable for ascertaining the smallest of three DC voltages. It consists of a voltage divider circuit of a series resistor 1 and three parallel resistors 2, 3 and 4, each of which is connected to the series resistor 1 by way of respective crystal diodes 5, 6 and 7. These crystal diodes are of such a polarity that they pass the voltage divider current. The resistors 1, 2, 3 and 4, are of such a size that they result in a voltage divider of a ratio of approximately 1:100.

The DC current to be applied to the series resistor 1 (at terminal 8) is so chosen that the partial voltage falling on the parallel resistors 2, 3 and 4 is at the most as large as, but preferably somewhat smaller than, the smallest color signal voltage occuring. In this connection it should be mentioned that the color signal voltages never assume the value of 0 with the largest occuring density value.

When the three signal voltages are applied to the terminals 9, 10 and 11 the circuit operates in the following manner.

Since, as is presumed, each of the three color signal voltages is higher than the partial voltage on the resistors 2, 3 and 4, than firstly all three crystal diodes 5, 6 and 7 are blocked. This means, however, that the voltage divider current is zero. Consequently, the voltage $U_x$ reaching the crystal diodes 5, 6 and 7 via the series resistor 1 (and the terminal 12) increases until it exceeds the smallest of the applied color signal voltages. At this moment, the crystal diode blocked by this color signal voltage again becomes unblocked so that the voltage $U_x$ again decreases and indeed so long as the voltage drop on the forward resistor of the crystal diodes is negligible, to the value of the smallest color signal voltage. Since both the remaining color signal voltages in this position of the circuit are larger than the voltage $U_x$, both the remaining crystal diodes are kept blocked and the circuit remains in this voltage condition until another of the three color signal voltages becomes the smallest.

The circuit arrangement according to FIG. 3 operates on the same principle, but is designed to ascertain the smallest of three alternating voltages. Therefore, all the same circuit elements, the function of which for positive half waves is the same as in the circuit according to FIG. 2, are provided with the same reference numeral as in FIG. 2.

The circuit elements becoming effective on the occurrence of the negative half waves have their references provided with prime markings e.g., 1′ . . . 8′, 16′ . . . 27′.

The alternating currents to be compared occur in three coils 13, 14 and 15 which are to be regarded as the secondary windings of three input transformers. By means of crystal diodes 16 and 16′, 17 and 17′ as well as 18 and 18′, the separation of the half waves is effected on each of these alternating currents.

The resistors 19 and 19′ are employed for decoupling the outputs, and the capacitors 20 and 20′ insure that DC voltage applied to the terminals 8 or 8′ is isolated from the output terminal 12. The resistors 21 and 21′, 22 and 22′ as well as 23 and 23′ are employed for decoupling on the input side. The common connection of the resistors 2, 3 and 4 and the common connection of the resistors 2′, 3′ and 4′ are connected to ground via the respective capacitors 24 and 24′ as far as AC is concerned. So far as DC is concerned, these common connection points, are, however, at a potential that is negative with respect to ground, the difference in potential being exactly the same as the voltage drop (oppositely directed), which occurs on the forward resistor of the crystal diode 5, 6, 7 or 5′, 6′, 7′. In this way the "dead area" is compensated, which the voltages to be compared otherwise would have had to overcome before the circuit became active.

Since the necessary bias voltage must be very stable, it is derived from a stabilizing circuit formed by a resistor 25 or 25′, with respect to the particular polarities, and a corresponding crystal diode 26 or 26′ which is supplied from a respective auxiliary voltage source 27 or 27′.

In the circuit illustrated in FIG. 3 the positive and negative half cycles of the input voltages are therefore effective in respective identical circuits to provide a resulting output signal at the terminal 12. The voltage $U_x'$, upon the application of the indicated potentials to terminals 8 and 8′ increases until it exceeds a smallest applied color signal voltage induced in the secondary windings 13–15. As in the case of the circuit of FIG. 2, the corresponding crystal diodes, for example 5 and 5′ become unblocked so that the voltage $U_x'$ again decreases as long as the voltage drop on the forward resistors of the crystal diodes is negligible, the voltage decreasing to the smallest color signal voltage. Inasmuch as the remaining color signal voltages are larger than $U_x'$, the remaining crystal diodes remain blocked until another of the three color signals becomes the smallest.

Many changes and modifications may be effected in the invention by those skilled in the art without departing from the spirit and scope thereof and it is to be understood that I wish to include within the patent warranted hereon all such changes and modifications as may reasonably and properly be included within the scope of the appended claims.

What I claim is:

1. A method for reproducing polychromatic picture originals in which color signal voltages are obtained by photoelectric scanning of the picture original with the interposition of color separation filters, controlling with said voltages a recording member for making the color separations, continuously comparing the color signal voltages with each other and extracting a signal voltage for producing a further separation, and utilizing as the further separation a narrow range white color separation.

2. A method according to claim 1, wherein the step of comparing color signal voltages and extracting a signal voltage is further defined as extracting the smallest voltage at any one time during continuous comparison and utilizing the extracted voltage for producing the white separation.

3. A method according to claim 1, further comprising the step of superimposing the white separation on the color separations as a mask.

4. A method according to claim 3, comprising the step of establishing a predetermined threshold value and forming the mask as a highlight mask for white separation signals that exceed the predetermined threshold value.

5. A method according to claim 4 comprising the step of forming a highlight mask from only that part of the white separation voltage that exceeds the predetermined threshold value.

6. A method for reproducing negative picture originals in which color signal voltages are obtained by photoelectric scanning of the negative picture original with the interposition of color separation filters, controlling a recording member with said voltages for making color separations, continuously comparing the color signal voltages with each other and extracting from said voltages a signal voltage for producing a further separation, and utilizing a narrow range white color separation as a negative black separation as the further separation.

* * * * *